(12) United States Patent
Bouyer et al.

(10) Patent No.: US 6,356,565 B1
(45) Date of Patent: Mar. 12, 2002

(54) METHOD OF CONTROLLING BANDWIDTH ALLOCATION IN SHARED ACCESS LOCAL NETWORKS AND A PROTOCOL AND A FILTER FOR IMPLEMENTING THE METHOD

(75) Inventors: Manuel Bouyer, Paris; Eric Horlait, Levallois, both of (FR)

(73) Assignee: Universite Pierre et Marie Curie (Paris VI), Paris (FR)

( * ) Notice: Subject to any disclaimer, the term of this patent is extended or adjusted under 35 U.S.C. 154(b) by 0 days.

(21) Appl. No.: 09/100,925

(22) Filed: Jun. 19, 1998

(30) Foreign Application Priority Data

Jun. 19, 1997 (FR) .............................. 97 07667

(51) Int. Cl.$^7$ ...................... H04L 12/407; H04L 12/417
(52) U.S. Cl. ........................ 370/468; 370/236; 370/400
(58) Field of Search .................................. 370/468, 477, 370/465, 397, 399, 400, 401, 402, 403, 404, 405, 410, 396, 398, 395, 409, 905, 464, 351, 352, 356, 270, 489, 450, 909, 910, 235, 236, 230

(56) References Cited

U.S. PATENT DOCUMENTS 5,467,348 A * 11/1995 Fujii et al.

FOREIGN PATENT DOCUMENTS

EP 0693840 A1 1/1996
WO WO 97/03189 1/1997

OTHER PUBLICATIONS

K. Park, "Self–Organized Multi–Class QoS Provision for ABR Traffic in ATM Networks," *IEEE*, pp. 446–453 (Mar. 1996).
S. Bahk et al., "Preventive Congestion Control Based Routing in ATM Networks," *IEEE*, pp. 1592–1599 (May 1994).
Tsang, et al., "A Two–Level Flow Control Scheme for ABR Traffic in ATM Networks" IEICE Trans. Commun., vol. E79–B. No. 11, Nov. 1996, pp. 1633–1641.*

* cited by examiner

*Primary Examiner*—William Luther
(74) *Attorney, Agent, or Firm*—Lahive & Cockfield, LLP

(57) ABSTRACT

To manage band allocation as a function of occupancy loading on a local network with high quality of service, the invention proposes a decentralized management protocol distributing allocation at all times by adapting the load of application streams to be transmitted to the bandwidths available on the network. According to the invention, the management method which includes token bucket filters as an output interface between the application stations and the transmission bus, comprises the steps of each network element broadcasting to each other network element, by connections through the protocol, reserved bandwidth parameters for best effort mode and for privileged modes concerning data streams; the network element establishes a parameter measuring the bandwidth available for its connection on the basis of a table of parameter values transmitted in the preceding step; and the network element concerned by the measurement parameter adjusts the value of its best effort parameter as a function of the variation in its available bandwidth parameter so as to preserve a positive or zero value therefor.

9 Claims, 3 Drawing Sheets

METHOD OF CONTROLLING BANDWIDTH ALLOCATION IN SHARED ACCESS LOCAL NETWORKS AND A PROTOCOL AND A FILTER FOR IMPLEMENTING THE METHOD

The invention relates to managing data streams in shared access local area networks, for example networks known under the names Ethernet or Token Ring, and interconnected with extended networks such as the Internet.

BACKGROUND OF THE INVENTION

The occupancy loading of a local network is conventionally managed by subdividing or segmenting its transmission capacities, with the network administrator allocating bandwidths statistically or dynamically as a function of the sizes of the applications loadings expected from the various stations of the network and as a function of the available resources.

The problem posed is to provide every network element (local network, router, applications system) or application of such a network with the ability at all times to transmit data streams with high quality of service, i.e. with an error rate that is as low as possible, and with minimum transmission time, regardless of the data stream loading of the application to be transmitted, and regardless of the occupancy states of the network and of the other interconnected network elements.

The quality of service provided by prior art protocols results directly from the acceptance capacity of the network which is shared in egalitarian manner between all users. This level corresponds to that which is commonly referred to as "best effort", and is offered to all data streams on the same network without taking other streams into account.

Centralized management protocols have been developed to manage data transmission, such as that described in the article by Y. Bernet, R. Yavatkar, and D. Hoffman, entitled "A proposal for admission control over Internet", published on the Internet by IETF (Internet engineering task force) under the name <draft-yavatkar-sbm-ethernet-03.txt> in its version of February 1997. These protocols are known under the initials SBM (subnet bandwidth management). The management obtained by such protocols remains completely dependent on a central managing site whose role is to share available resources in terms of bandwidth. Centralized management makes network operation vulnerable to error or breakdown of the central site.

A localized management service is described, for example, in the article by J. Wroclawski entitled "Specification of the controlled-load network element service" published on the Internet by IETF under the name <draft-ietf-intersv-ctrl-load-svc-04.txt> in its November 1996 version. Such a service controls a set of token bucket filters disposed at the interface between each application and a network element. That protocol makes it possible to provide bandwidth by allocating bands via queues through which data passes, as a function of the predetermined characteristics of the token buckets.

Those protocols depend on other information interchange mechanisms, such as the RSVP protocol, for example (resource reservation setup protocol).

The quality of service of such management using a decentralized protocol is substantially of the best effort type, with the various applications sharing the same available resources. Packets that do not comply with the parameters, and processed in best effort mode, are at best deferred, with rates being limited to a maximum value and packets of sizes greater than said value are refused.

Such a protocol defines a "controlled-load" service: it can process packets that do not comply with the parameters of the bucket, it can delay packets that result from distortions and that may be deemed out of compliance in order to be able to pass through the filter; however it refuses data packets of a size greater than the reference size of the bucket. At each network element, e.g. of an Ethernet network, it is then necessary to provide a maximum value for the stream rates of each application, even though that does not guarantee there will be no collisions or no loss of information packets.

A token bucket filter has a bucket with parameters adapted to best effort mode for streams of standard data packets, and buckets with parameters adapted to each stream of data packets having special or privileged specifications in order to enable the various streams to be put into queues and transmitted to the outputs from the buckets as a function of network availabilities.

Those solutions do not solve the problem posed, in particular they do not make it possible to manage band allocation as a function of network occupancy loading and with high quality of service.

OBJECTS AND SUMMARY OF THE INVENTION

To solve this problem, the present invention proposes implementing a decentralized management protocol that, at all times, shares out optimized allocation by adapting the loading of the applications streams to be transmitted to the bandwidths available on the network.

More precisely, the invention provides a method of managing allocated bandwidths of a shared access local network comprising applications stations, switching buses and data transmissions, and token bucket filters as output interfaces between the applications stations and the bus for transmission to the network. The method comprises the following steps:

each network element broadcasts to each of the other network elements, via connections through the protocol, the reserved bandwidths of the data streams to be transmitted (for best effort mode and for privileged odes);

each network element then determines a value of a parameter measuring the bandwidth available for its connection, for which purpose each network element establishes a table of the parameter values transmitted in the preceding step; and the network element adjusts the value of its best effort parameter as a function of variation in its available bandwidth parameter so as to preserve a positive or zero value therefor.

This method is compatible with using the IP protocol (Internet protocol) for the connections of the shared local network to other networks or to extended networks. This method can also take advantage of using RSVP with which it is compatible.

When a reservation request is made, the management method of the invention may include additional steps in order to decide whether to accept or reject the corresponding reservations, said steps comprising:

comparing the values of the best effort parameters with their minimum value, a new element being unacceptable if all of the best effort parameters are already at their minimum value $r_{min}$ since the availability parameter $r_{fr}$ of the new element is then necessarily negative;

accepting the reservation increase $\Delta r$ of a privileged stream if it is less than or equal to the availability parameter $r_{fr}$ of the element; and refusing said reservation increase if:

it satisfies the condition: $\Delta r > \Sigma(r_{pr}+r_{min})$ at least one of the recalculated availability values $r_{fr}$ remains negative after decreasing the best effort parameters.

Other additional steps can be added in order to take account of special situations or to optimize the sharing of reservations:

if two elements require the same increase of reservation simultaneously, then the requests can be rejected even though one of them alone would have succeeded; it is possible to provide for reservation applications to be repeated randomly in time;

when the best effort mode queue is overloaded, $r_a$ can be increased by decreasing the availability parameter $r_{fr}$, e.g. by making 50% of the value of $r_{fr}$ available;

if the real value of the rate parameter in best effort mode is significantly smaller (e.g. more than 10%) than the reservation parameter $r_a$, then the parameter $r_a$ can be decreased to remain close to its real value, thus making it possible to use the band available in best effort mode dynamically, i.e. as a function of requirements; and when a risk of overload in best effort mode is reasonably predictable, e.g. if numerous packets in privileged mode do not comply with privileged mode format in a particular application, then these packets are sent in best effort mode if no decrease in $r_a$ is caused thereby.

The invention also relates to a special token bucket filter structure which, in best effort mode, has a plurality of queues, e.g. two queues respectively having high priority for the out-of-compliance packets of a special application, and low priority for packets that are to be processed conventionally in best effort mode.

The invention also provides a distributed management protocol for implementing the method of managing bandwidths. The protocol is a purely distributed protocol which implements both-way interchange of information with each network element to adjust the parameters of the token buckets in order to optimize the occupancy loading of the network.

Two types of parameter are adjusted: those of the best effort mode bucket and those of the reserved mode buckets; with this being done by modulating the parameters of one type relative to those of the other type so as to weight allocation of resources respectively between best effort type streams and privileged type streams as a function of requirements.

BRIEF DESCRIPTION OF THE DRAWINGS

Other characteristics and advantages of the invention appear on reading the following more detailed description together with the accompanying drawings, in which, respectively.

MORE DETAILED DESCRIPTION

In an extended network, a controlled-load service is defined by each element of the network (router, local network, or operating system) supplying a management protocol with specifications concerning the characteristics of the data packet streams of each application.

Figure 1:
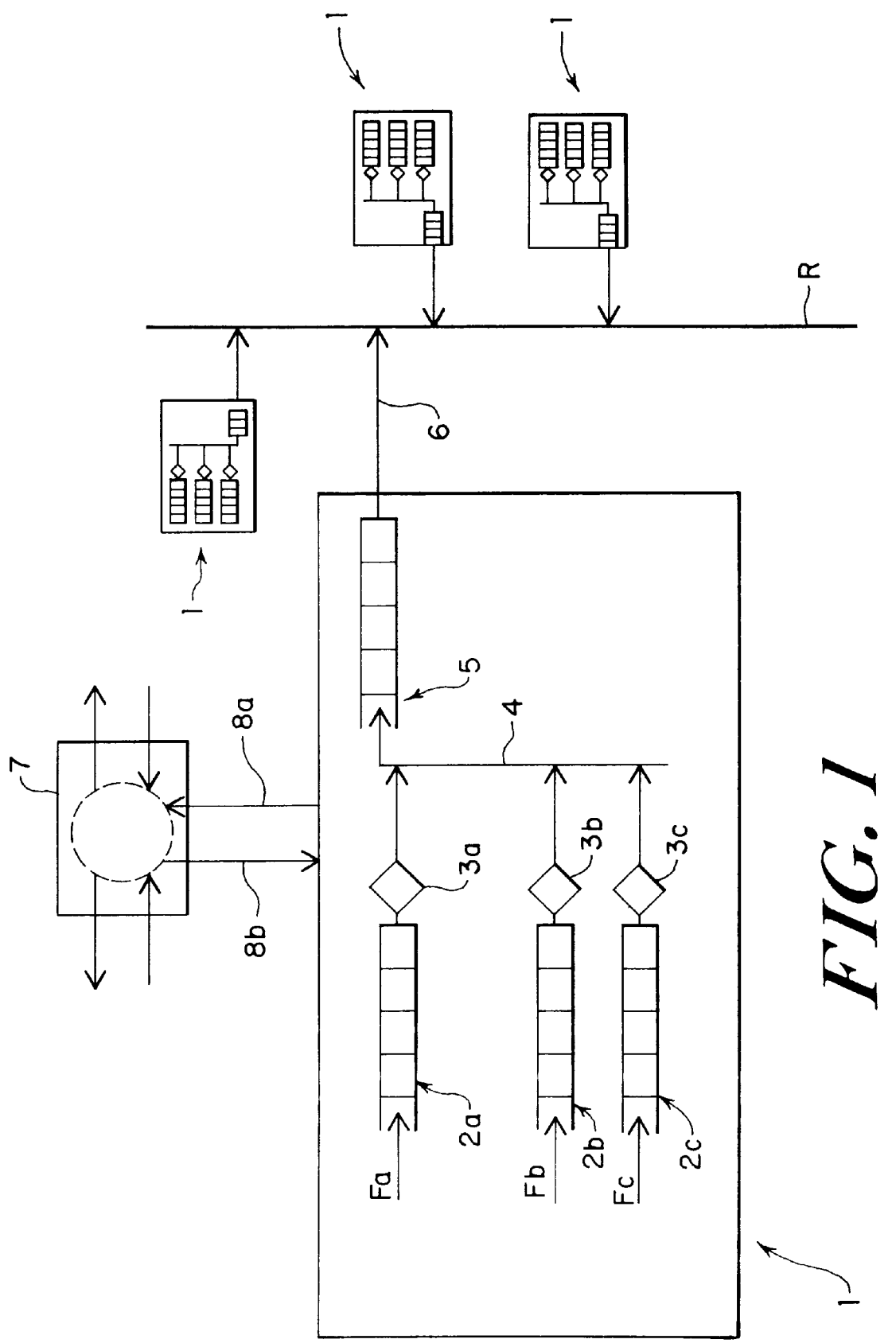
FIG. 1 shows the organization of the distributed protocol of the invention.

As shown in FIG. 1, the distributed organization of the protocol of the invention makes use of a classification of the streams Fa, Fb, Fc of each application in "token bucket" filters 1 of the controlled-load service type, i.e. depending on whether they belong to the "best effort" standard of quality of service (Fa) or whether they require a special or privileged quality of service (Fb, Fc): in the first case they are segmented into packets of standard format in a queue in register 2a and then processed by the bucket 3a. In the second case, they are placed in queues of customized format in special registers 2b, 2c before being processed by the corresponding buckets 3b, 3c. A switching bus 4 controlled by the protocol provides transmission to the output register 5 which is connected to the access device 6 giving access to the network bus R.

More precisely, the specifications of the streams include evaluating values for the parameters of the buckets 3a, 3b, and 3c: token rates $r_a$, $r_b$, and $r_c$ (equal to the ratio between the number of tokens divided by the time it takes them to return to the free state), and sizes of the buckets (respectively equal to the numbers $n_a$, $n_b$, and $n_c$ of tokens), for each of the applications concerned.

The protocol 7 manages the admission of each network element as a function of the resource available on the transmission link 6, i.e. the bandwidth which is statistically available.

The invention provides a high quality of service by using a purely distributed protocol 7 implementing a both-way interchange of information 8a and 8b with each application to adjust the parameters of the token buckets in order to optimize the occupancy load of the network.

Rules for adjusting the parameters of the token buckets managed by the protocol then enable data having all types of specification to be transmitted. According to the invention, two types of parameter are adjusted: the parameters of the best effort mode bucket and the parameters of the privileged mode buckets; with this being done by modulating the parameters of one type relative to those of the other in order to weight allocation of resources between the best effort type streams and the privileged type streams, as a function of requirements.

Figure 2:
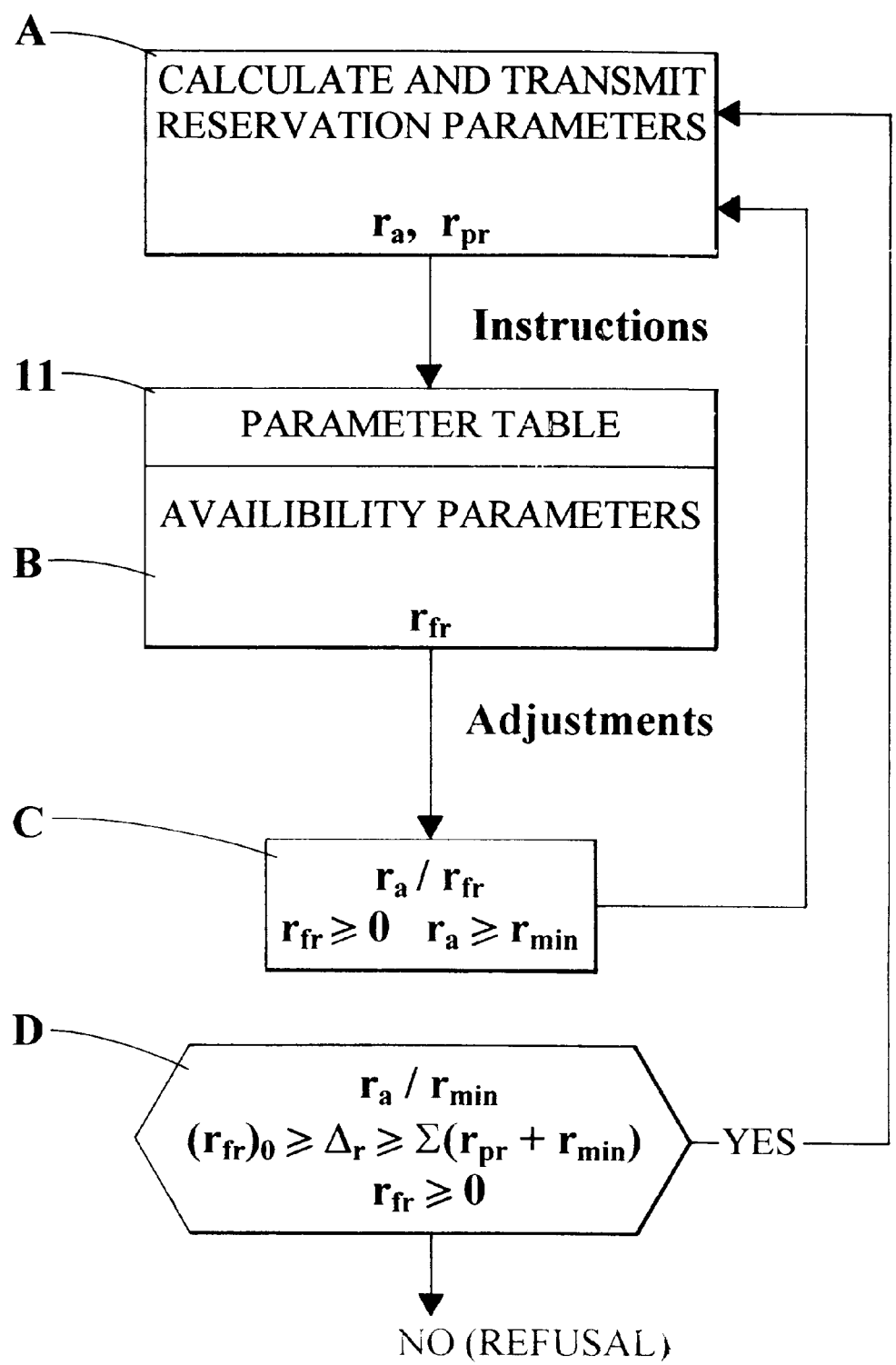
FIG. 2 is a flow chart summarizing the basic architecture of the method of the invention for controlling data stream loads in a shared local network.

The summary flow chart of FIG. 2 shows the basic architecture of the method of the invention of managing data streams of a shared local network.

At step A of this architecture, each network element broadcasts to all the other elements of the network the bandwidths reserved for best effort mode and for privileged modes relating to streams of data to be transmitted from its applications.

The two reservation parameters broadcast are, for example, the rates $r_a$ of the best effort buckets, and the sum of the privileged rates $r_{pr}$ (i.e. $r_b+r_c+$ . . . ) . The network elements thus periodically transmit the values of the parameters $r_a$ and $r_{pr}$, together with a minimum value for r, written $r_{min}$.

At step B, the network element establishes the bandwidth available for its connection. Each network element establishes a table 11 of values for the parameters $r_a$ and $r_{pr}$ of all of the known network elements connected to the connection bus. This table 11 provides the value for the available bandwidth by calculating a parameter $r_{fr}$ using the following expression:

$$r_{fr} = \frac{r_{max} - \Sigma(r_a + r_{pr})}{N}$$

in which $\Sigma$ represents the sum of the values for the rates given to all of the network elements, $r_{max}$ represents the total bandwidth of the element on the connection bus, and N represents the number of network elements.

At step C, the network element adjusts the value of the best effort parameter $r_a$ as a function of the variation in the available bandwidth parameter $r_{fr}$ so as to preserve a positive or zero value for the available bandwidth parameter in order to be capable of transmitting at all times. In this example, when the value of $r_{fr}$ becomes negative, the network element decreases the value of $r_a$ as follows, providing $r_a$ is not already at its minimum value $r_{min}$:

$$\frac{r_a - r_{min}}{\Sigma(r_a - r_{min})}[1 - \Sigma(r_a + r_{pr})]$$

After communicating the new value of $r_a$, the network element recalculates its band availability value $r_{fr}$ in order to obtain a new value only after it has received the rate values $r_a$ transmitted by the other elements.

When new reservations are expected, e.g. when a privileged application of a network element is modified or when a new element is connected, a step D is applied in this example in order to decide whether the corresponding reservations are to be accepted or rejected, step D comprising:

comparing the values of the best effort parameters with their minimum value: a new element is not acceptable if all of the best effort parameters $r_a$ have already been given their minimum value $r_{min}$, since the availability parameter $(r_{fr})_0$ of the new element would then necessarily be negative;

the increase in reservation $\Delta r$ for a privileged stream is accepted if it is less than or equal to the availability parameter $(r_{fr})_0$ of the element concerned; and this increase in reservation is refused if:
it satisfies the condition: $\Delta r > E(r_{pr}, r_{min})$
at least one of the recalculated availability
values $r_{fr}$ remains negative after decreasing the best effort parameters.

Additional steps may be provided for managing special situations or for optimizing the distribution of reservations:

if two elements require the same increase of reservation simultaneously, then the requests can be rejected even though one of them alone would have succeeded; it is possible to provide for reservation applications to be repeated randomly in time;

when the best effort mode queue is overloaded, $r_a$ can be increased by decreasing the availability parameter $r_{fr}$, e.g. by making 50% of the value of $r_{fr}$ available;

if the real value of the rate parameter in best effort mode is significantly smaller (e.g. more than 10%) than the reservation parameter $r_a$, then the parameter $r_a$ can be decreased to remain close to its real value, thus making it possible to use the band available in best effort mode dynamically, i.e. as a function of requirements; and when a risk of overload in best effort mode is reasonably predictable, e.g. if numerous packets in privileged mode do not comply with privileged mode format in a particular application, then these packets are sent in best effort mode if no decrease in $r_a$ is caused thereby.

Also, certain applications generate traffic peaks with a low mean rate and do not require greater security against errors than that offered by best effort mode. These applications are those which implement broadcast protocols, such as RIP (route information protocol) and other routing protocols, NTP (network time protocol), or RSVP. Data streams of this type do not require special or privileged quality of service. They only require special transmission priority.

Figure 3:
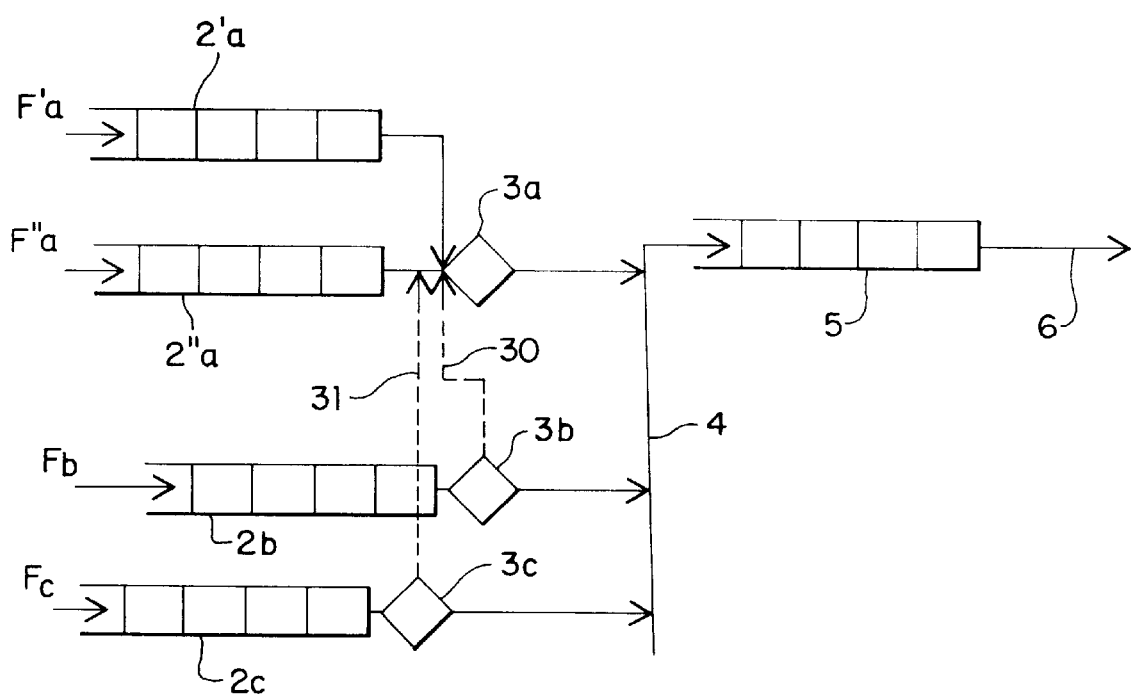
FIG. 3 shows a variant of the token bucket filter of the invention.

It is then possible in a variant to use a token bucket filter structure in best effort mode with a plurality of queues, for example two queues, as shown diagrammatically in FIG. 3, reproducing the basis of the architecture shown in FIG. 1. Two queues 2'a and 2"a are provided ahead of the token bucket of the best effort mode in the architecture shown with, respectively, high priority for the packets of stream F'a of the special application and low priority for the packets of stream F"a that are to be processed conventionally in best effort mode. Dashed line connections 30 and 31 respectively indicate equivalent processing priorities for the priority best effort 2'a and the privileged mode 2b, and for the non-priority best effort F"a and the privileged mode 2c.

In an application under UNIX® of the method of the invention, the message transmitted by a network element is made up of five 32-bit numbers representing in succession the version of the protocol used and other flags (arrival or departure of a network element), and the values of $r_a$, $r_{min}$, $r_{pr}$, and $r_{max}$.

The use of 32-bit numbers makes it possible to give bandwidth values of up to 4 Gigabyte/s. A time base T=10 s is used to control the various events and for timing.

Initially, network element 1 (FIG. 1) sends the above-described message over connection 8a with $r_{pr}=0$, and $r_a=r_{min}$, and begins to listen for messages coming from connection 8b. A message is sent every 2T–$\Delta_t$, where $\Delta_t$ belongs to the range 0 to 1 second, so as to avoid synchronization between the various network elements. Where necessary, and if the band availability value $r_{fr}$ allows, $r_a$ can be adjusted before sending a message.

When a message is received, the protocol version is checked initially. If the version of if the value of $r_{max}$ do not correspond to those expected, then an error message is formed. If the sender of the message is identified, the corresponding values of the parameter table are updated. If the sender of the message is not known, then the message information is added to the table.

During changes to reservation values that make $r_{fr}$ go negative, the new parameters are not recalculated until time T/2, i.e. 5 s, has elapsed, unless $r_{fr}$ becomes positive again. If $r_{fr}$ remains negative for more than 3T/2, i.e. 15 s, then an error message is formed.

The invention is not limited to the embodiments described and shown. For example, it can be applied to managing passbands in multimedia applications on the Internet on the basis of ATM type connections (i.e. in asynchronous transfer mode).

The invention can also be used for sharing and controlling rates in asynchronous distributed environments. For example, organizing air or road traffic, where the invention can be applied directly by using a larger time base suitable for the systems being controlled.

What is claimed is:

1. A method of managing the bandwidth allocated in a shared access local network comprising applications stations, switching buses and data transmission links, and token bucket filters as output interfaces between the applications stations and the bus for transmission to the network, the method comprising the following steps:

each network element broadcasting to each of the other network elements via connections through the protocol, values of reserved bandwidth parameters for best effort mode and for privileged modes concerning data streams to be transmitted;

each network element determining the value of a parameter measuring the bandwidth available for its connection on the basis of a table of values for the parameters transmitted in the preceding step; and the network element adjusts the value of its best effort parameter as a function of variation in its available bandwidth parameter so as to preserve a positive or zero value therefor.

2. A management method according to claim 1, wherein the reservation parameters that are broadcast are the best effort bucket rate $r_a$ and the sum of the privileged bucket rates $r_{pr}$, the network elements periodically transmitting the values of the parameters $r_a$ and $r_{pr}$, together with a minimum value $r_{min}$ for $r_a$.

3. A management method according to claim 1, including an additional step to decide whether to accept or reject an increase of reservations, the step comprising:

comparing the values of the best effort parameters with their minimum value, a new element being unacceptable if all of the best effort parameters are already at their minimum value $r_{min}$;

accepting the reservation increase $\Delta r$ of a privileged stream if it is less than or equal to the availability parameter $r_{fr}$ of the element; and refusing said reservation increase if:

it satisfies the condition: $\Delta r > E(r_{pr}+r_{min})$ at least one of the recalculated availability values $r_{fr}$ remains negative after decreasing the best effort parameters.

4. A management method according to claim 1, including the following additional step when two elements simultaneously require the same increase of reservation: requests for reservation are repeated randomly in time.

5. A management method according to claim 1, including, when the best effort mode queue is overloaded, an additional step of increasing $r_a$ by decreasing the availability parameter $r_{fr}$.

6. A management method according to claim 1, including the following additional step if the real value of the best effort mode rate parameter is significantly less than the reservation parameter $r_a$: the parameter $r_a$ is decreased to remain close to its real value.

7. A management method according to claim 1, including the following additional step when a risk of overload in best effort mode is reasonably to be expected:

these packets are sent in best effort mode if that give rise to no decrease in $r_a$.

8. A token bucket filter structure for implementing the method according to claim 1, wherein, in best effort mode it has a plurality of queues, with high priority for packets of a special application and low priority for other packets to be processed in best effort mode.

9. A distributed management protocol for implementing the method of managing bandwidth according to claim 1, and implementing a both-way interchange of information with each application to adjust the token bucket parameters in order to optimize the occupancy loading of the network.

* * * * *